United States Patent [19]

Usina

[11] Patent Number: 4,924,685
[45] Date of Patent: May 15, 1990

[54] STEERING WHEEL LOCKING MECHANISMS FOR CARS AND TRUCKS

[76] Inventor: Juan S. Usina, Avenida Joanot Martorell Nr. 38, 46600 Alcira, Valencia, Spain

[21] Appl. No.: 312,529

[22] Filed: Feb. 17, 1989

[51] Int. Cl.$^5$ ............................................ E05B 13/10
[52] U.S. Cl. ...................................... 70/218; 70/252
[58] Field of Search ............... 70/252, 218, 222, 223, 70/188, 189, 237

[56] References Cited

U.S. PATENT DOCUMENTS

| | | | |
|---|---|---|---|
| 1,548,636 | 8/1925 | Schwitzer | 70/189 |
| 1,549,460 | 8/1925 | Decker | 70/189 |
| 1,591,034 | 7/1926 | George | 70/189 |
| 1,657,402 | 1/1928 | Kenworthy et al. | 70/252 |
| 1,661,447 | 3/1928 | Seng | 70/252 |
| 1,699,973 | 1/1929 | Kenworthy | 70/252 |
| 4,581,909 | 4/1986 | Weber | 70/186 |
| 4,589,513 | 5/1986 | Proffitt | 70/252 X |
| 4,811,580 | 3/1989 | Jang | 70/218 |

FOREIGN PATENT DOCUMENTS

| | | | |
|---|---|---|---|
| 181964 | 2/1918 | Canada | 70/218 |
| 2569147 | 2/1986 | France | 70/252 |
| 153967 | 11/1920 | United Kingdom | 70/252 |

*Primary Examiner*—Lloyd A. Gall
*Attorney, Agent, or Firm*—Flynn, Thiel, Boutell & Tanis

[57] ABSTRACT

Modifications in the steering wheel locking and unlocking means in cars and trucks include a cylindrical body (3) which houses the steering shaft (1) with the possibility of axial displacement, and is fitted with upper and lower flanges (4) and (5) respectively, forming a spool, between which there is an eccentric cam (9) solidly joined to the shaft of the ignition and starter key switch, with the upper flange (4) having some ascending rods (11) in two diametrically opposed points, which cross a block (12) solidly joined to the steering wheel (10), and which are fitted to a locking spider (14) which engages with an internal block (20) solidly joined to the steering shaft (1) so as to be housed within some radial notches (24) of the internal block, for solidly joining the steering wheel to the steering shaft and, the spider (14) being engagable, through elevation, within some other radial notches (26) made in an upper plug (28) screwed to the external block (12).

3 Claims, 2 Drawing Sheets

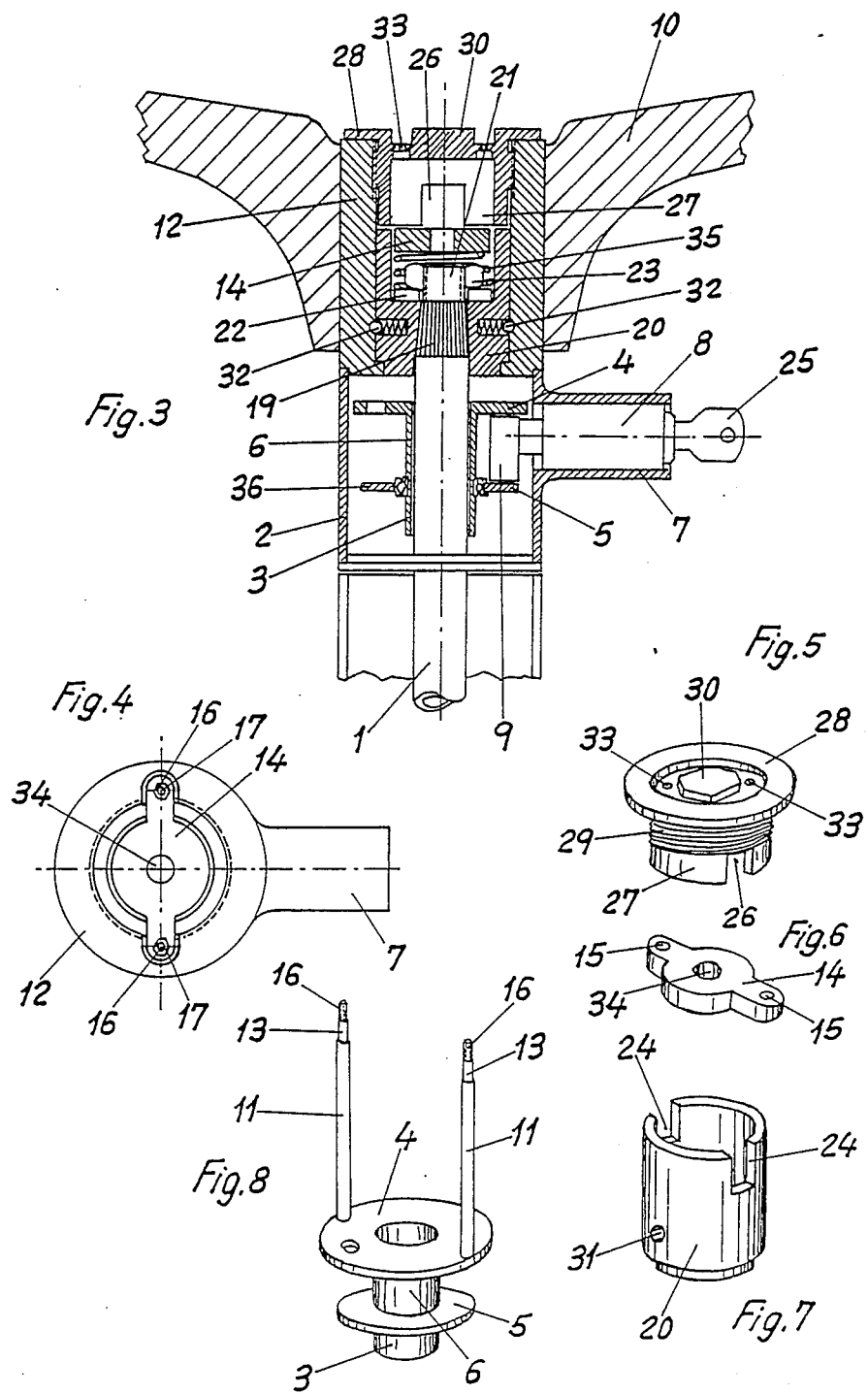

STEERING WHEEL LOCKING MECHANISMS FOR CARS AND TRUCKS

FIELD OF THE INVENTION

The invention deals with some important improvements introduced in steering wheel locking means for cars and trucks, fundamentally designed for obtaining efficient theft-proofing means, with the characteristic that the ignition key simultaneously locks the steering wheel, and when the ignition key switch is removed, the steering wheel will remain free, so that when it is handled, it rotates freely, and therefore the vehicle cannot be steered and consequently it is impossible for it to be stolen, this feature being of great interest for users given the simplicity in putting it into service, given that with the same ignition key, the locking or unlocking is established, with complete certainty and in the unlikely event of breakage or breakdown, the steering wheel would always remain locked and the vehicle in a position to be driven, the improvements being designed with some simple mechanisms not liable to break down.

BACKGROUND OF THE INVENTION

The present technique used in the different theft-proofing mechanisms and devices which have been used are preferably studied for having hidden current cut out microswitches to prevent unwanted activation of the starter, there being others in which the steering wheel is dismantled and taken away by the user, thus preventing driving, but in many cases these means turn out to be inefficient due to the thieves' skill in finding them.

SUMMARY OF THE INVENTION

The improvements which are the object of this invention attempt to eliminate all the difficulties and disadvantages stated in the above paragraph, for they are designed so that the actual ignition key, as well as its characteristic function, produces the mechanical locking or unlocking of the steering wheel, as the actual cylinder of the ignition key switch has an eccentric cam which will displace some mechanisms axially so that a spider will act as a medium for the locking or unlocking of the steering wheel, the spider being housed within some notches in some bushings which will immobilize or unlock the steering wheel.

BRIEF DESCRIPTION OF THE DRAWINGS

For a better understanding of the general characteristics given above, some drawings are enclosed in which are shown a graphically represented practical realization of the invention. The drawings in question, should be examined with the broadest approach and without a limiting nature.

The figures represented in the enclosed drawings show as specified below:

FIG. 3. Diametrical perpendicular section of the unit in FIGS. 1 and 2, noting the arrangement of the eccentric cam of the cylinder shaft, situated between the small flanges of a part which can move around the steering shaft as a spool, fitted with some ascending rods which secure the interlocking spider, remaining in the lowest position in accordance with FIG. 1, establishing contact and coupling the steering wheel to the steering shaft.

FIG. 4. Upper view of the mechanisms without the top closing plug, the arrangement being seen of the interlocking spider whose ends are housed in some notches made radially in the external body of the mechanisms, whose ends extend in the lower part into the interior bushing solidly joined to the steering shaft so as to obtain the interlocking, and in the upper part into other notches in the plug for the unlocking of the steering wheel.

FIG. 5. Perspective view of the upper closing plug, fitted with some orifices on both sides for the horn switch and a central prismatic body for allowing it to be dismantled, with the radial notches on both sides being included in the threaded neck protruding in the lower part so as to allow the housing of the interlocking spider.

FIG. 6. Perspective view of the interlocking spider fitted with a central orificed body for the horn leads, having some arms protruding at two diametrically opposed points and provided with orifices at the ends so as to receive ascending rods which form part of the part which can move along with the eccentric cam joined to the cylinder of the ignition key switch.

FIG. 7. Perspective view of the fluted, coneshaped, axially orificed interior bushing for coupling to the steering shaft by a nut and washer, with the radial notches made in two diametrically opposed points for the interlocking of the spider being illustrated.

FIG. 8. Perspective view of the part moving along with the eccentric cam, which takes on the form of a spool with two parallel, distanced flanges, having an axial through hole for the steering shaft with sufficient play, with the upper flange having some joint ascending rods with which, at the graded-shaped end support, the interlocking spider is secured by means of nuts.

DETAILED DESCRIPTION

Figure 1:
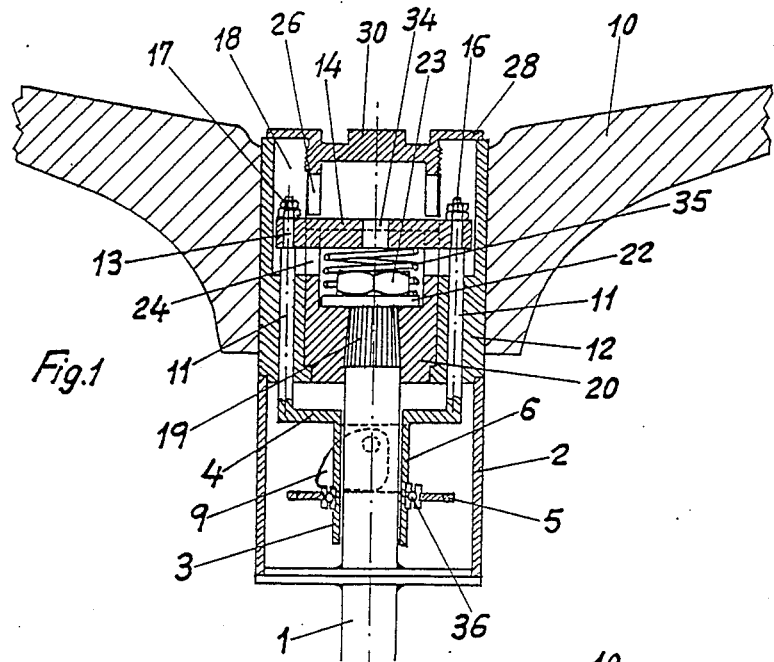
FIG. 1. Diametrical vertical section of the set of mechanisms constituting the improvements, assembled and with the cam secured to the shaft of the ignition key cylinder, with the steering wheel connected and interlocked, and the interior spider in its lowest position, so that the ends are housed within some radial notches in the internal bushing solidly joined to the steering shaft.

Still in reference to the enclosed drawings, it must be stated that in the different figures given in them, numerical references related to the descriptions made below of their characteristics and functioning are given, thus facilitating their immediate finding, with (1) being the steering shaft of the vehicle which remains housed inside the bushing (2), inside which a hollow, spool-shaped part or bushing (3) is incorporated with upper (4) and lower (5) flanges, the part (3) having a central cylindrical body (6) inside which the steering shaft (1) runs with sufficient free movement. The bushing (2) having on one side and in a protruding manner the joint bushing (7) which houses the cylinder, or shaft (8) for the ignition and start-up of the vehicle, which shaft protruding on its inner end the eccentric cam (9) joined solidly thereto for the mechanical actuation of the mechanisms by means of which the locking or unlocking of the steering wheel (10) will take place.

The eccentric cam (9) shall be housed between the upper (4) and lower (5) flanges of the spool (3) so as to obtain its axial ascending and descending displacement, with the upper flange having some vertical, parallel rods (11) located at two diametrically opposed points, which rods shall be housed inside some through holes made in the upper block (12) which constitutes the steering wheel (10) support, the rods protruding through the upper end where there is the grading, or reduced diameter end portion (13), which is received in the spider (14) fitted with the lateral orifices (15) where the ends of the rods (11) are introduced, secured through their threaded end (16) by means of the tightening nuts (17), going through the inside of the radial grooves (18) made at two diametrically opposed points in the upper block, or hub (12).

The steering shaft (1) is coupled at its upper cone-shaped fluted end (19) to the internal block, or cylindrical bushing (20), it being solidly secured at its threaded end (21) by means of the washer (22) and the nut (23), this internal block (20) being supported at its lower end on an internal rim of the external block 12 and constituting a prolongation of the steering shaft (1) with regard to its rotation, with the interlocking of the steering wheel (10) with the steering shaft (1) occurring when the ignition key witch is actuated to place the eccentric cam (9) in the lower part, as can be seen in FIGS. 1 and 3, so that intermediate portions of the spider (14) go inside the radial notches (24) in the internal block (20), and as its ends also go inside the radial grooves (18) of the upper block (12) supporting the steering wheel (10), the actual steering wheel will be secured to the steering shaft.

Figure 2:
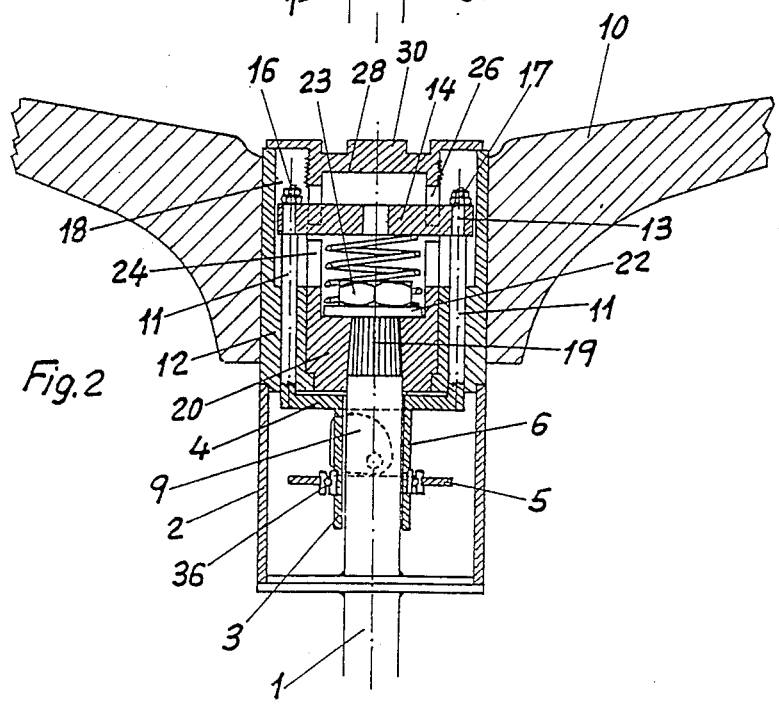
FIG. 2. The same section view as FIG. 1, but with the ignition and starter key disconnected, noted the arrangement of the eccentric cam fitted to the cylinder shaft with its eccentricity in its highest point, so that it moves the interior spider upwards, it being unlocked from the internal bushing solidly joined to the steering shaft, with the mentioned spider being housed in the radial notches in the upper plug, and the steering wheel rotating freely.

So as to leave the steering wheel (10) rotating freely of the steering shaft (1), the ignition key (25) will be turned on, placing the eccentric cam (9) in its highest position as can be seen in FIG. 2, with the vehicle engine also stopping, in which case the spider (14), on ascending, comes out of its interlocking with the radial notches (24) of the internal block (20) solidly joined to the steering wheel (10), going inside the notches (26) made radially in the descending neck (27) of the upper plug (28), the latter having threading (29) reaching the upper block (12), covering the actual plug (28), with the radial grooves (18) having, in their upper part, a prismatic protrusion (30) for dismantling by means of the appropriate tool, for any inspection or repair.

The internal block (20) has one or several blind orifices (31) where a spring and ball (32) are housed, facing, at one point of their rotation, another orifice made in the upper block (12) for the alignment of the correct position for the interlocking or unlocking of the steering wheel (10), facilitating the user's search for this position, with some through holes (33) being included for the passing of the wires which will activate the horn, as well as a central orifice (34) in the spider (14) for the same purpose, being put in through the central orifice of the steering shaft until the circuit is established.

Between the top of the internal block (20) and the lower plane of the spider (14), there is a check spring (35) whose tendency is to push the mentioned spider upwards so as to establish the interlocking of the spider (14) in the notches (26) of the upper plug (28), obliging the spool-shaped part (3) to be placed as high up as possible, supporting its lower flange (5) fitted with the bearing (36) to remain leaning on the eccentric cam (9), preventing rubbing, as this lower flange (5) has free rotation.

Considering that each and every one of the parts which constitute the improvements introduced in the steering wheel locking mechanisms for cars and trucks have been amply described, only the possibility remains to be stated that their different parts may be manufactured in a variety of materials, sizes and shapes, and those variations in construction type recommended by practice may also be introduced in their constitution, provided that they cannot alter the essential points to which the present invention is directed.

The embodiments of the invention in which an exclusive property or privilege is claimed are defined as follows:

1. A steering wheel locking mechanism for vehicles, comprising:

a steering wheel, and a hub arranged centrally in said steering wheel and fixed thereto;

a steering shaft supported in said hub for relative rotation therewith and projecting in an axial direction from said hub, a hollow, spool-shaped bushing carried axially slidably on said steering shaft and axially alongside said hub, said steering shaft extending axially through said spool-shaped bushing, said spool-shaped bushing including a pair of axially spaced flanges which extend away from said steering shaft;

an ignition key switch supported stationarily relative to said hub and including a rotatably supported shaft, said shaft having at one end an eccentric cam, disposed snugly axially between said flanges of said spool-shaped bushing, eccentric rotation of said eccentric cam causing reciprocal axial displacement of said spool-shaped bushing along said steering shaft between respective locking and unlocking positions; and locking means responsive to said axial displacement of said spool-shaped bushing for selectively locking said steering shaft to said hub and said steering wheel for rotation therewith when said spool-shaped bushing is in said locking position, said locking means including the one of said flanges of said spool-shaped bushing which faces said hub having a pair of axially extending rods mounted thereon, said rods being located on said flange so as to be substantially diametrically opposed to one another, said hub including a pair of axial through holes wherein said rods are respectively axially slidably received, each of said rods extending completely through said hub and having a reduced diameter free end portion, said locking means further including a spider extending between said reduced diameter free end portions of said rods and including a pair of holes in which said reduced diameter free end portions of said rods are respectively axially received, said free end portions of said rods being fixedly secured to said spider, said spider being carried on said rods for reciprocal axial displacement with said spool-shaped bushing.

2. The steering wheel locking mechanism according to claim 1, wherein said hub includes means for defining a radially projecting internal rim at an end thereof adjacent said spool-shaped bushing, and wherein said locking means includes an internal bushing rotatably housed in said hub and axially supported on said internal rim, said internal bushing having a fluted, cone-shaped axial through hole therein, said steering shaft having a fluted, cone-shaped axial end which is axially received in said fluted, cone-shaped through hole of said bushing, said axial end of said steering shaft including a threaded portion, said steering shaft having a nut threadedly engaged on said threaded portion and fixing said steering shaft to said internal bushing, said internal bushing having means for defining a pair of diametrically opposed notches in an end thereof adjacent said spider and on opposite sides of said cone-shaped axial through hole, said notches in said internal bushing being adapted to axially receive respective intermediate portions of said spider located between said rods when said spool-shaped bushing is in said locking position, whereby said internal bushing is in said locking position, whereby said internal bushing is locked to said hub for rotation therewith.

3. The steering wheel locking mechanism according to claim 2, wherein said hub includes a closing plug at an axial end thereof opposite said spool-shaped bushing, said closing plug having a neck which extends axially toward said spool-shaped bushing and which includes means for defining a pair of diametrically opposed notches therein adapted to axially receive said intermediate portions of said spider when said spool-shaped bushing is in said unlocking position, said notches in said neck being radially aligned with and axially spaced from said notches in said internal bushing.

* * * * *

UNITED STATES PATENT AND TRADEMARK OFFICE
CERTIFICATE OF CORRECTION

PATENT NO. : 4 924 685

DATED : May 15, 1990

INVENTOR(S) : Juan Sala USINA

It is certified that error appears in the above-identified patent and that said Letters Patent is hereby corrected as shown below:

Col. 5, line 13; after "position" delete ---whereby said internal bushing is in said locking position---.

Signed and Sealed this

Tenth Day of December, 1991

Attest:

HARRY F. MANBECK, JR.

*Attesting Officer*  *Commissioner of Patents and Trademarks*